United States Patent
Kang et al.

(10) Patent No.: US 12,271,615 B2
(45) Date of Patent: Apr. 8, 2025

(54) SYSTEMS AND METHODS FOR CHECKING DATA ALIGNMENT BETWEEN APPLICATIONS, FILE SYSTEMS, AND COMPUTATIONAL STORAGE DEVICES

(71) Applicant: Samsung Electronics Co., Ltd., Suwon-si (KR)

(72) Inventors: Yangwook Kang, San Jose, CA (US); Yang Seok Ki, Palo Alto, CA (US); Changho Choi, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 108 days.

(21) Appl. No.: 18/117,384

(22) Filed: Mar. 3, 2023

(65) Prior Publication Data

US 2023/0289084 A1 Sep. 14, 2023

Related U.S. Application Data

(60) Provisional application No. 63/319,272, filed on Mar. 11, 2022.

(51) Int. Cl.
*G06F 3/06* (2006.01)

(52) U.S. Cl.
CPC .......... *G06F 3/0644* (2013.01); *G06F 3/0604* (2013.01); *G06F 3/0679* (2013.01)

(58) Field of Classification Search
CPC .... G06F 3/0644; G06F 3/0604; G06F 3/0679; G06F 3/0635; G06F 3/0638; G06F 3/061; G06F 3/0631; G06F 3/0685; G06F 3/0688; G06F 3/0626; G06F 3/0658;
(Continued)

(56) References Cited

U.S. PATENT DOCUMENTS

| | | | |
|---|---|---|---|
| 5,987,479 | A | 11/1999 | Oliver |
| 6,016,552 | A | 1/2000 | Lee et al. |
| 6,745,311 | B2 | 6/2004 | Fabrizio et al. |

(Continued)

FOREIGN PATENT DOCUMENTS

| | | |
|---|---|---|
| CN | 111625546 A | 9/2020 |
| CN | 111752482 A | 10/2020 |
| JP | H10283230 A | 10/1998 |

OTHER PUBLICATIONS

Wikipedia, RAID, Jan. 10, 2020, Wikipedia, as preserved by the Internet Archive on Jan. 10, 2020, pp. 1-17 https://web.archive.org/web/20200110002859/https://en.wikipedia.org/wiki/RAID (Year: 2020).*

(Continued)

*Primary Examiner* — Curtis James Kortman
(74) *Attorney, Agent, or Firm* — Renaissance IP Law Group LLP

(57) ABSTRACT

Systems and methods for memory management are described. An example method can include: performing a first determination that may include: comparing a first parameter associated with a storage device to a second parameter associated with an application. In addition, the method may include performing a second determination based on the first determination, where the second determination may include: inserting data into a storage partition of the storage device; and determining to store a minimum processing unit associated with the data in the storage device.

19 Claims, 6 Drawing Sheets

(58) Field of Classification Search
CPC ........... G06F 3/0689; G06F 2212/1016; G06F 2212/1041; G06F 2212/262
See application file for complete search history.

(56) References Cited

U.S. PATENT DOCUMENTS

| | | | |
|---|---|---|---|
| 7,685,126 | B2 | 3/2010 | Patel et al. |
| 7,689,798 | B2 | 3/2010 | Åberg et al. |
| 7,937,421 | B2 | 5/2011 | Mikesell et al. |
| 8,065,482 | B2 | 11/2011 | Sato et al. |
| 9,489,148 | B2 | 11/2016 | Goss et al. |
| 9,933,944 | B2 | 4/2018 | Nukariya et al. |
| 10,078,451 | B1* | 9/2018 | Floyd ................... G06F 3/0631 |
| 10,126,955 | B2 | 11/2018 | Kang |
| 10,228,867 | B2 | 3/2019 | Vervaet et al. |
| 10,949,107 | B1 | 3/2021 | Basov et al. |
| 2011/0205658 | A1* | 8/2011 | Moyer ............... G11B 20/1217 |
| 2013/0311712 | A1* | 11/2013 | Aso .................... G06F 12/0246 711/103 |
| 2015/0277802 | A1 | 10/2015 | Oikarinen et al. |
| 2016/0328184 | A1 | 11/2016 | Patel et al. |
| 2017/0344285 | A1 | 11/2017 | Choi et al. |
| 2018/0293161 | A1* | 10/2018 | Nellayi .................. G06F 3/067 |
| 2019/0243906 | A1* | 8/2019 | Bisson ................. G06F 3/0643 |
| 2022/0214810 | A1* | 7/2022 | Adams ................ G06F 3/0689 |

OTHER PUBLICATIONS

European Extended Search Report for Application No. 23161024.7, mailed Jul. 12, 2023.

European Office Action for Application No. 23161024.7, mailed May 6, 2024.

Tantisiriroj, Wittawat et al., "Data-Intensive File Systems for Internet Services: A Rose by Any Other Name", Technical Report CMUPDL-08-114, Parallel Data Laboratory, Carnegie Mellon University, 2008, 23 pages.

Wang, Feng et al., "OBFS: A File System for Object-Based Storage Devices", Proceedings of the Twenty-First Symposium on Mass Storage Systems (MSST), vol. 4, 2004, pp. 283-300.

* cited by examiner

SYSTEMS AND METHODS FOR CHECKING DATA ALIGNMENT BETWEEN APPLICATIONS, FILE SYSTEMS, AND COMPUTATIONAL STORAGE DEVICES

RELATED APPLICATIONS

The present application claims the benefit of U.S. Provisional Patent Application Ser. No. 63/319,272 entitled "DB PAGE ALIGNMENT FOR COMPUTATIONAL STORAGE DEVICES" filed on Mar. 11, 2022, which is incorporated herein by reference in its entirety.

FIELD

The disclosure relate generally to application compatibility checking mechanisms and more particularly to systems and methods for data alignment for computational storage in storage drives.

BACKGROUND

The present background section is intended to provide context only, and the disclosure of any concept in this section does not constitute an admission that said concept is prior art.

A computational storage device may include one or more processing resources that may operate on data stored within the device. A host may offload a processing task to the storage device, for example, by sending a user program and/or input data for the user program to the device. The one or more processing resources may execute the user program and send output data from the user program to the host.

The above information disclosed in this background section is only for enhancement of understanding of the background of the disclosure and therefore it may contain information that does not constitute prior art.

SUMMARY

In various embodiments, described herein include systems, methods, and apparatuses for offloading operations and/or computations to a storage device such as a solid state drive (SSD) in association with a processing element.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method for memory management is described. The method may include performing a first determination that may include: comparing a first parameter associated with a storage device to a second parameter associated with an application. The method may also include performing a second determination based on the first determination, where the second determination may include: inserting data into a storage partition of the storage device, and determining to store a minimum processing unit associated with the data in the storage device. Other embodiments of this aspect include corresponding computer systems, apparatus, and computer programs recorded on one or more computer storage devices, each configured to perform the actions of the methods.

Implementations may include one or more of the following features. The first parameter may include a minimum processing unit size and the first parameter may include a variable-length unit or a fixed-length unit. The first parameter may include a minimum processing unit size and the second parameter may include a block size of a file system. The first parameter may include a minimum processing unit size and the second parameter may include a file system fragment size. The first parameter may include a minimum processing unit size and the second parameter may include a RAID stripe size. The first parameter may include a minimum processing unit size and the second parameter may include a key value object size. Implementations of the described techniques may include hardware, a method or process, or a computer tangible medium.

In one general aspect, a device for memory management is described. The device may include one or more processors. The device may use the processors to perform a first determination that may include: comparing a first parameter associated with a storage device to a second parameter associated with an application. The device may furthermore include performing a second determination based on the first determination, where the second determination may include: inserting data into a storage partition of the storage device and determining to store a minimum processing unit associated with the data in the storage device. Other embodiments of this aspect include corresponding computer systems, apparatus, and computer programs recorded on one or more computer storage devices, each configured to perform the actions of the methods.

Implementations may include one or more of the following features. The device where the first parameter may include a minimum processing unit size and the first parameter may include a variable-length unit or a fixed-length unit. The device where the first parameter may include a minimum processing unit size and the second parameter may include a block size of a file system. The device where the first parameter may include minimum processing unit size and the second parameter may include a file system fragment size. The device where the first parameter may include minimum processing unit size and the second parameter may include a RAID stripe size. The device where the first parameter may include minimum processing unit size and the second parameter may include a key value object size. The device where the device may include a computational storage device.

In one general aspect, non-transitory computer-readable medium for memory management is described. The non-transitory computer-readable medium may include one or more instructions that, when executed by one or more processors of a device, cause the device to: perform a first determination that may include: compare a first parameter associated with a storage device to a second parameter associated with an application. The instructions may cause the device perform a second determination based on the first determination, where the second determination may include: insert data into a storage partition of the storage device, and determine to store a minimum processing unit associated with the data in the storage device. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the first parameter may include a minimum processing unit size and the first parameter may include a variable-length unit or a fixed-length unit. The non-transitory computer-readable medium where the first parameter may include a minimum processing unit size and the second parameter may include a block size of a file system. The non-transitory computer-readable medium where the first parameter may include minimum processing unit size and the second parameter may include a file system fragment size. The non-transitory computer-readable medium where the first parameter may include minimum processing unit size and the second parameter may include a RAID stripe size. The non-transitory computer-readable medium where the first parameter may include minimum processing unit size and the second parameter may include a key value object size. The non-transitory computer-readable medium where the device may include a computational storage device. Implementations of the described techniques may include hardware, a method or process, or a computer tangible medium.

Similarly, non-transitory computer-readable media, devices, and systems for performing substantially the same or similar operations as described above are further disclosed. Accordingly, particular embodiments of the subject matter described herein can be implemented so as to realize one or more of the following advantages. The disclosed systems can provide a means to validate a software and hardware environment for computational storage devices to run particular applications in a more efficient manner. The disclosed systems can provide a means to increase computational efficiency of applications by ensuring the data alignment between supporting layers of a computational storage environment (e.g., a datacenter or server environment). The disclosed systems can facilitate computational near data (e.g., via computational storage devices) with increased efficiency, thereby leading the decreased power and energy usage per unit of computation. Easily validate the software and hardware environment for computational storage devices

BRIEF DESCRIPTION OF THE DRAWINGS

The above-mentioned aspects and other aspects of the present techniques will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

Figure 1:
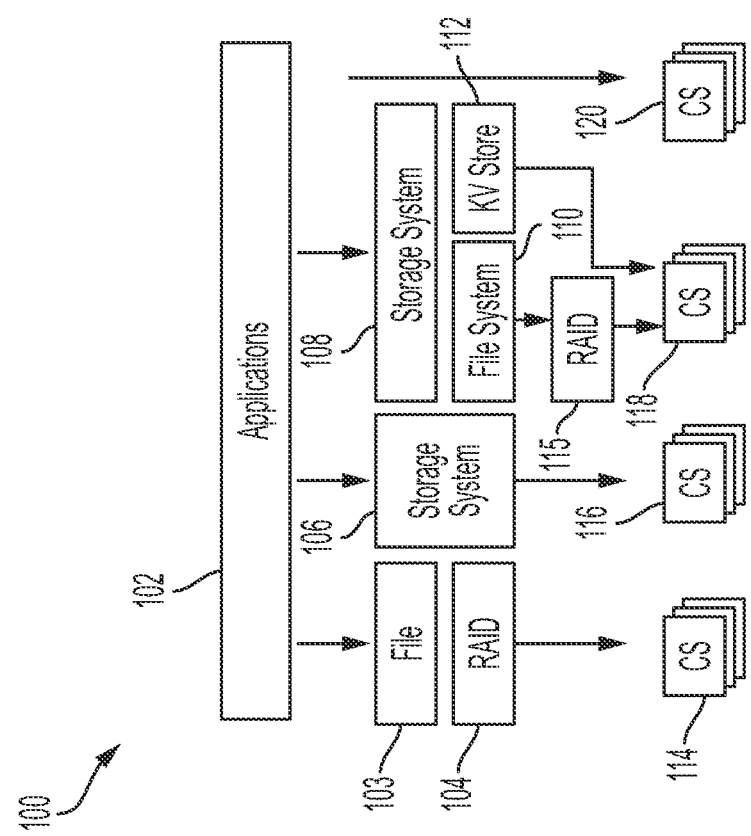
FIG. 1 shows an example diagram representing a computational storage environment in which the disclosed systems can operate, the environment including host applications, various intermediate software and hardware layers, and one or more computational storage devices, in accordance with example embodiments of the disclosure.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

In the fields of computing and storage, various computational workloads may be partitioned into tasks, one or more of which may be performed by a computational device such as a central processing unit (CPU), an accelerator device, a computational storage device, and/or the like. A task may be performed, for example, by a CPU, may read input data from a data structure that may be stored, for example, at a storage device. Depending on the implementation details, this arrangement of tasks may involve relatively high overhead, for example, to transfer data from the storage device to the CPU, and/or to transfer data from the CPU to the accelerator device. Accordingly, some aspects the disclosure relate to the use of a computational storage device (CSD) to perform a task involving reading and/or writing data. For example, in a computational scheme in accordance with example embodiments of the disclosure, a first task of a workload associated with an application (e.g., host-based application) may be performed at a CSD which may read input data from a data structure that may be stored at the CSD.

In some aspects, data processing on a CSD may require access to one or more independently processible data blocks associated with an application (e.g., application running on a host). Since applications may be configured to run using various combinations of storage and system layers (e.g., configurations that determine how data is transmitted over a network), the underlying layers may not be configured accordingly based on the corresponding application's processing unit, which is an independently addressable data block. Thus each associated layer may have a different processing unit, which can cause an application's data block to ultimately be split and be stored across multiple CSDs, which may be an undesirable scenario at least from a computational efficiency perspective. Thus, to determine whether a given application can efficiently be executed on a certain storage layer configuration associated with one or more CSDs, each layer's configuration needs to be checked to see if the application's processing unit can be delivered and/or stored to storage devices without being split.

In various embodiments of the disclosure, systems and methods for application compatibility determination can validate a given storage layer configuration both in a static and dynamic manner, as further described herein. As used herein, static can refer to performing methods to check a configuration of the components in the storage layers without actually running applications on them. Further, dynamic can refer to performing methods to run tests on the given storage layers and configurations to check if data alignment requirements are met.

As noted, in order to utilize CSDs, it may be necessary that an entire data processing unit associated with an application be stored to a device. Accordingly, application compatibility checking systems and associated methods can check a corresponding data alignment (how data is arranged and accessed in computer memory) between the application, and one or more systems such as a redundant array of independent disks (RAID) system, compute engine, files system, and storage system, combinations thereof, and/or the like. Further, the disclosed systems describe systems and methods to check an application's data alignment between multiple storage layers. Moreover, while the specific systems noted are described herein, it is understood that other similar systems can use the disclosed systems and methods in a similar fashion.

This disclosure encompasses numerous aspects relating to operating computational devices. The principles disclosed herein may have independent utility and may be embodied individually, and not every embodiment may utilize every principle. Moreover, the principles may also be embodied in various combinations, some of which may amplify some benefits of the individual principles in a synergistic manner.

For purposes of illustration, some embodiments may be described in the context some specific implementation details such as machine learning workloads, communication protocols such as Compute Express Link (CXL), and/or the like. However, the principles are not limited to these or any other specific implementation details.

As noted, in order to perform data processing on a system such as those including CSDs, each CSD may need to have access to the independently processible data blocks of a corresponding application, for example, an application running on a host server. As used herein a host may be implemented with any component or combination of components such as a compute server, a storage server, a network server, a cloud server, and/or the like, a node such as a storage node, a computer such as a workstation, a personal computer, a tablet, a smartphone, and/or the like, or multiples and/or combinations thereof.

FIG. 1 shows an example diagram representing a computational storage environment in which the disclosed systems can operate, the environment including host applications, various intermediate software and hardware layers, and one or more computational storage devices, in accordance with example embodiments of the disclosure. As shown in FIG. 1, applications 102 can run on top of various combinations of storage (e.g., computational storage (CS) devices such as CS 114, 116, 118, and/or 120) and system layers (e.g., file systems 103, RAID systems 104, storage systems 106 that can include block storage), and/or storage system 108 that can include file systems 110 and/or RAID sub-systems 115, and/or key-value stores 112). In some aspects, the underlying layers (with respect to the application 102) may not be aware (e.g., have notification about and/or access to) of the application's corresponding processing unit. Further, each layer (e.g., layer including file systems 103, RAID systems 104, storage systems 106 that can include block storage) may require a different processing unit, which can cause the application's 102 corresponding data block to be split and therefore be stored across multiple CSDs (e.g., CS 114, 116, 118, and/or 120). To efficiently utilize CSDs in a given computing and storage environment, the entire data processing unit of a given application 102 may need to be stored to a device. To determine if a given application can run on a certain storage layer configuration, the disclosed systems can check each layer's configuration needs to determine whether the application's 102 processing unit can be delivered to storage devices (e.g., CS 114, 116, 118, and/or 120) without being split. In various aspects of the disclosure, the disclosed systems include application compatibility systems and corresponding methods that can, in part, validate the given storage configuration both statically and dynamically.

In various aspects, a computational storage device (e.g., CS 114, 116, 118, and/or 120) may be implemented with any type of storage device using any type of memory and/or storage media including any other type of solid state media, magnetic media, optical media, and/or the like. For example, in some embodiments, a storage device may be implemented as an SSD based not-AND (NAND) flash memory, persistent memory (PMEM) such as cross-gridded nonvolatile memory, memory with bulk resistance change, phase change memory (PCM), dynamic random access memory (DRAM), and/or the like, and/or any combination thereof.

Any of the computational storage devices disclosed herein may be implemented in any form factor such as 3.5 inch, 2.5 inch, 1.8 inch, M.2, Enterprise and Data Center SSD Form Factor (EDSFF), NF1, and/or the like, using any connector configuration such as Serial ATA (SATA), Small Computer System Interface (SCSI), Serial Attached SCSI (SAS), U.2, and/or the like. Any of the storage devices disclosed herein may be implemented entirely or partially with, and/or used in connection with, a server chassis, server rack, dataroom, datacenter, edge datacenter, mobile edge datacenter, and/or any combinations thereof. In some embodiments, a computational storage device may be implemented as a computational storage drive, a computational storage processor (CSP), and/or a computational storage array (CSA).

In some embodiments, a computational storage device may be implemented with a device other than a storage device, for example, any type of device that may include, or have access to, memory, storage media, and/or the like, to store an amount of data that may be processed by one or more computational resources. Examples may include memory expansion and/or buffer devices such as CXL type 2 and/or CXL type 3 devices, as well as CXL type 1 devices that may have access to memory, storage media, and/or the like.

A computational storage device (e.g., CS 114, 116, 118, and/or 120) may be implemented with any type of device such as an accelerator device, a storage device (e.g., a computational storage device), a network device (e.g., a network interface card (NIC)), a CPU, a GPU, a neural processing unit (NPU), a tensor processing unit (TPU), a data processing unit (DPU) and/or the like, or multiples and/or combination thereof.

A computational storage device can include computational resources that may be implemented with any component or combination of components that may perform operations on data such as combinational logic, sequential logic, timers, counters, registers, state machines, complex programmable logic devices (CPLDs), field programmable gate arrays (FPGAs), application specific integrated circuits (ASICs), embedded processors, microcontrollers, central processing units (CPUs) such as complex instruction set computer (CISC) processors (e.g., x86 processors) and/or a reduced instruction set computer (RISC) processors such as ARM processors, and/or the like, and/or combinations thereof.

The computational storage devices can be connected to the host and other intervening layers discussed above via an interconnect fabric that may be implemented with one or more interconnects, one or more networks, a network of networks (e.g., an internet), and/or the like, or a combination thereof, using any type of interface and/or protocol. For example, the interconnect fabric 224 may be implemented with Peripheral Component Interconnect Express (PCIe), NVMe, NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROCE), FibreChannel, InfiniBand, Serial ATA (SATA), Small Computer Systems Interface (SCSI), Serial Attached SCSI (SAS), iWARP, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), and/or the like, Advanced eXtensible Interface (AXI), any generation of wireless network including 2G, 3G, 4G, 5G, 6G, and/or the like, any generation of Wi-Fi, Bluetooth, near-field communication (NFC), and/or the like, or any combination thereof. In some embodiments, the interconnect fabric may include one or more root complexes, switches, hubs, nodes, routers, and/or the like.

In some embodiments, the interconnect fabric may be configured to transfer data (e.g., application data) directly between components, for example, without involvement, intervention, processor utilization (e.g., CPU utilization), and/or the like, by a host. For example, in an embodiment implemented at least partially with CXL, the interconnect fabric may be configured to transfer data from a computational storage device to a host application or another computational storage device, for example, using a CXL switch, a PCIe root complex, a PCIe switch, PCIe peer-to-peer (P2P) communication, CXL P2P communication, and/or the like.

Figure 2:
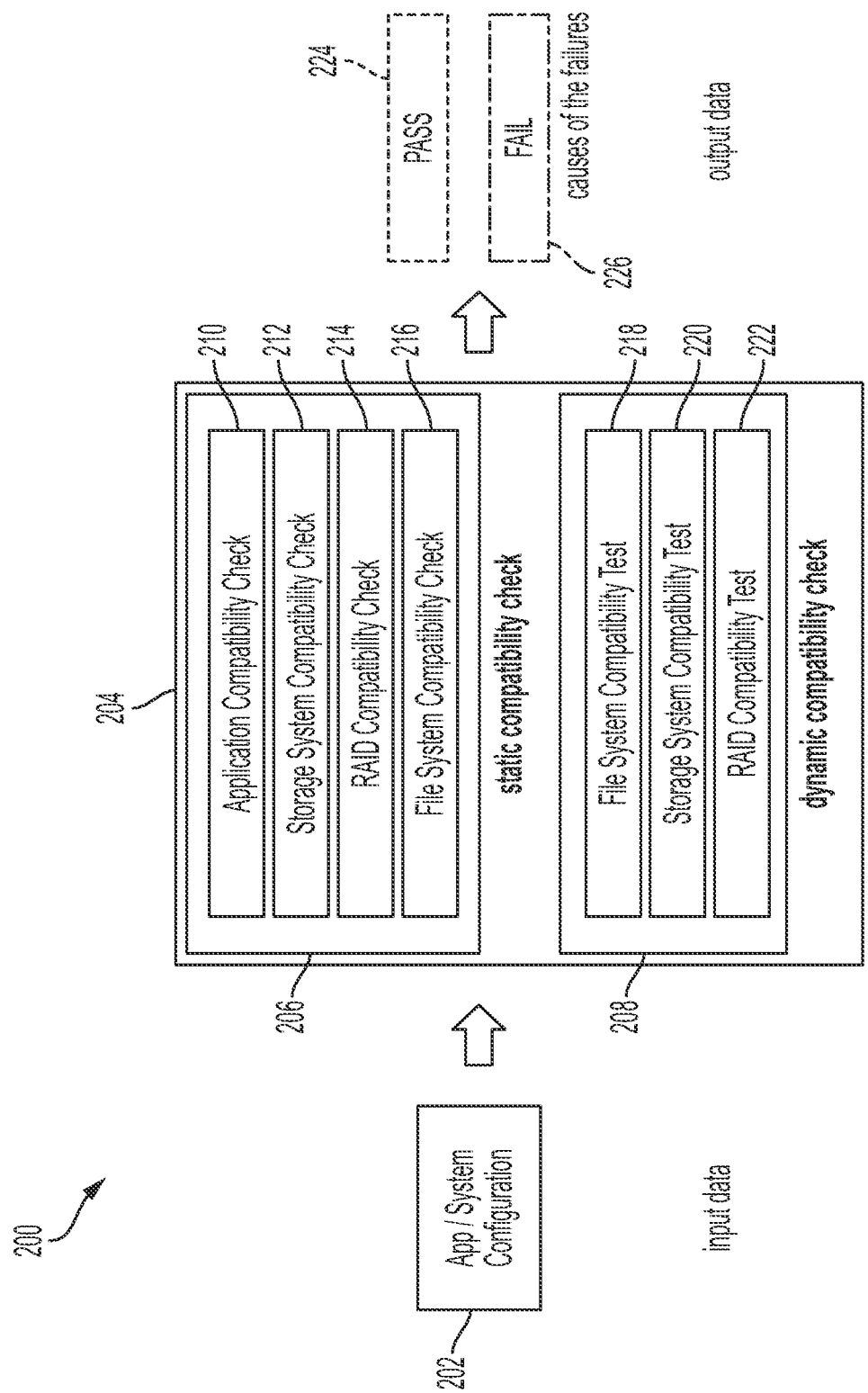
FIG. 2 shows an example diagram representing the disclosed systems for application compatibility determination including modules for granular determination of various subsystems for computational storage devices including both static and dynamic compatibility analyses, in accordance with example embodiments of the disclosure.

FIG. 2 shows an example diagram representing the disclosed systems for application compatibility determination including modules for granular determination of various subsystems for computational storage devices including both static and dynamic compatibility analyses, in accordance with example embodiments of the disclosure. In some aspects, the system 200 can include an application compatibility module 204, which can include a static compatibility checking module 206 that includes an application compatibility check 210 module, a storage system compatibility check 212 module, a RAID compatibility check 214 module, and a file system compatibility check 216 module. In another aspect, the application compatibility module 204 can include a dynamic compatibility checking module 208 that includes a file system compatibility test 218 module, a storage system compatibility test 220 module, and a RAID compatibility test 222 module.

In some respects, the static compatibility checking module 206 can be configured to perform a first static analysis of the application's compatibility with a storage device. In particular, the static compatibility checking module 206 can receive input data from an application/system configuration 202 module based on an application (e.g., an application running on a host server, not shown). The static compatibility checking module 206 can then use the input data and determine whether underlying layers (e.g., layers such as file systems 102, RAID systems 104, storage systems 106 that can include block storage, as shown and described in connection with FIG. 1, above) meet one or more conditions to determine that the application's processing unit can be delivered to storage devices (e.g., CS 114, 116, 118, and/or 120 as shown and described in connection with FIG. 1, above) without being split (e.g., a pass 224 condition), that is divided at least in two portions. If the result of the determination is that the application's processing unit cannot be delivered to storage devices without being split, then that can represent a fail 226 condition, which can further warrant an operator's and/or system's further determination of various causes of the failure. For example, the potential causes of the failure can include a case where a file system block size is not a positive multiple of an application processing unit size, and a case where an application processing unit is a variable-length while one or more of the underlying layers are using fixed-length units.

In some aspects, the disclosed systems can determine various criteria based on variables representing application and storage systems states, which can be described via equations. In particular, a variable P can represent an application's processing unit size (units (e.g., bytes (B), kilobyte (KB), megabyte (MB), gigabyte (GB), terabyte (TB), petabyte (PB), and/or the like), a variable B can represent a file system block size, a variable F can represent a file system fragment size, and a variable S can represent a RAID stripe size. For the application's processing unit to be stored to a storage device (e.g., a CSD) without being split, one or more of the following conditions may need to be met:

$$B = k*P \text{ (}k\text{ is }N\text{, where }N\text{ is a positive integer)}$$

$$F = m*P \text{ (}m\text{ is }N\text{, where }N\text{ is a positive integer)}$$

$$S = n*P \text{ (}n\text{ is }N\text{, where }N\text{ is a positive integer)}$$

In various aspects, the above equations can be determined to hold by an analysis performed by the static compatibility checking module 206. In particular, the static compatibility checking module 206 can determine that the file system block size B is an integer multiple of the application's processing unit P, that the file system fragment size F is an integer multiple of the application's processing unit P, and that the RAID stripe size S is an integer multiple of the application's processing unit P. If one or more or all of these conditions hold, then the static compatibility checking module 206 can determine that the underlying layers meets the conditions required for the application's processing unit being delivered to the storage device without being split, and the static compatibility checking module 206 can therefore generate a pass 224 result. If any of the above conditions are not met, then the static compatibility checking module 206 can determine that the underlying layers do not meet the conditions required for the application's processing unit to be delivered to the storage device without being split, and the static compatibility checking module 206 can therefore generate a fail 226 result.

In some aspects, the application compatibility check 210 module can determine that the application's processing unit has a minimum processing unit that can be a variable-length unit (V) or can be a fixed-length unit (P). If the minimum processing unit is a variable-length unit, then the disclosed systems may need to make additional arrangements such that a proper coordination of in-storage computation (ISC) mechanisms may be required, for example, at the compute-engine level. For example, a compute engine can internally use a key-value store or an object-based storage system to store its variable-length data directly into one of the storage devices instead of relying on a RAID subsystem. Then, the compute engine can send an ISC command to the device to process the data.

If the minimum processing unit is a fixed-length unit, then the disclosed systems may determine a proper data alignment condition holds across all storage layers. Accordingly, the application compatibility check 210 module can generate the pass 224 condition if an application can access a device (e.g., a CSD) directly.

In other aspects, the storage system engine compatibility check 212 module can determine a fail 226 condition if a variable-length unit (V) is set but also that variable-length data processing is not supported by one or more devices in the system (e.g., a CSD). In other aspects, the storage system engine compatibility check 212 module can determine a fail 226 condition if a fixed-length unit (P) is set but also that fixed-length data processing is not supported by one or more devices in the system (e.g., a CSD). Otherwise, the storage system engine compatibility check 212 can determine a pass 224 condition.

In some aspects, the RAID compatibility check 216 module can determine a fail 226 condition if a RAID stripe size S is not a positive multiple of the application's processing unit P. the RAID compatibility check 216 module can determine a pass 224 condition if RAID is not used, a variable-length unit (V) is used, and/or the RAID stripe size (S) is a positive multiple of the application's processing unit (P).

In other aspects, the file system compatibility check 216 module can determine a pass 224 condition if a file system is not used. If fragments are used, file system compatibility check 216 module can determine a pass 224 condition if the file system fragment size (F) is a positive multiple of the application's processing unit P. Otherwise, if blocks are used, the file system compatibility check 216 module can determine a pass condition if the file system block size (B) is a positive multiple of the application's processing unit P.

In some aspects, the storage system compatibility check 216 module can determine a fail 226 condition if a data distribution unit (D) is not a positive multiple of P or if D is variable-length and greater than P. The storage system compatibility check 216 module can determine a pass 224 condition if a storage system is not used, or if a data distribution unit is a positive multiple of P.

In some respects, the dynamic compatibility checking module 208 can receive input data from an application/system configuration 202 module based on an application (e.g., an application running on a host server, not shown). In other aspects, even if static compatibility checking module 206 generates a fail 226 condition (e.g., based on certain criteria as shown as described above), data alignment can still be implicitly supported by each layer's internal data management mechanisms or options. Accordingly, the dynamic compatibility checking module 208 can still generate a pass condition and thereby indicate a compatibility between the application and the CSD. For example, the static analysis checking module 206 may generate a fail condition if P is 8 KB and B is 4 KB in size; however, in certain file systems (e.g., Linux-based XFS) with stride and stripe options, P can be aligned to a RAID stripe. In a different file system (e.g., EXT4) with the same option, when there is not an enough space, P can still be split across multiple disks. Thus the dynamic compatibility checking module 208 can perform a dynamic analysis of the system and can run compatibility tests to see if the input data can be distributed without being split.

In some aspects, the disclosed systems can run a compatibility check (e.g., a storage System, RAID, file system compatibility check) for a given RAID configuration. Further, the disclosed systems can then generate a file system with a suitable options (e.g., stride and stripe-width options). Accordingly, the disclosed systems can run an insert operation to fill an entire partition through a storage system, check if each P is stored in a single disk. Then the disclosed systems can update, delete, and/or insert workloads on the same partition and check if each P is stored in a single disk. If a software RAID is used, the disclosed systems can vary the RAID configuration as well until a valid data alignment is determined.

Figure 3:
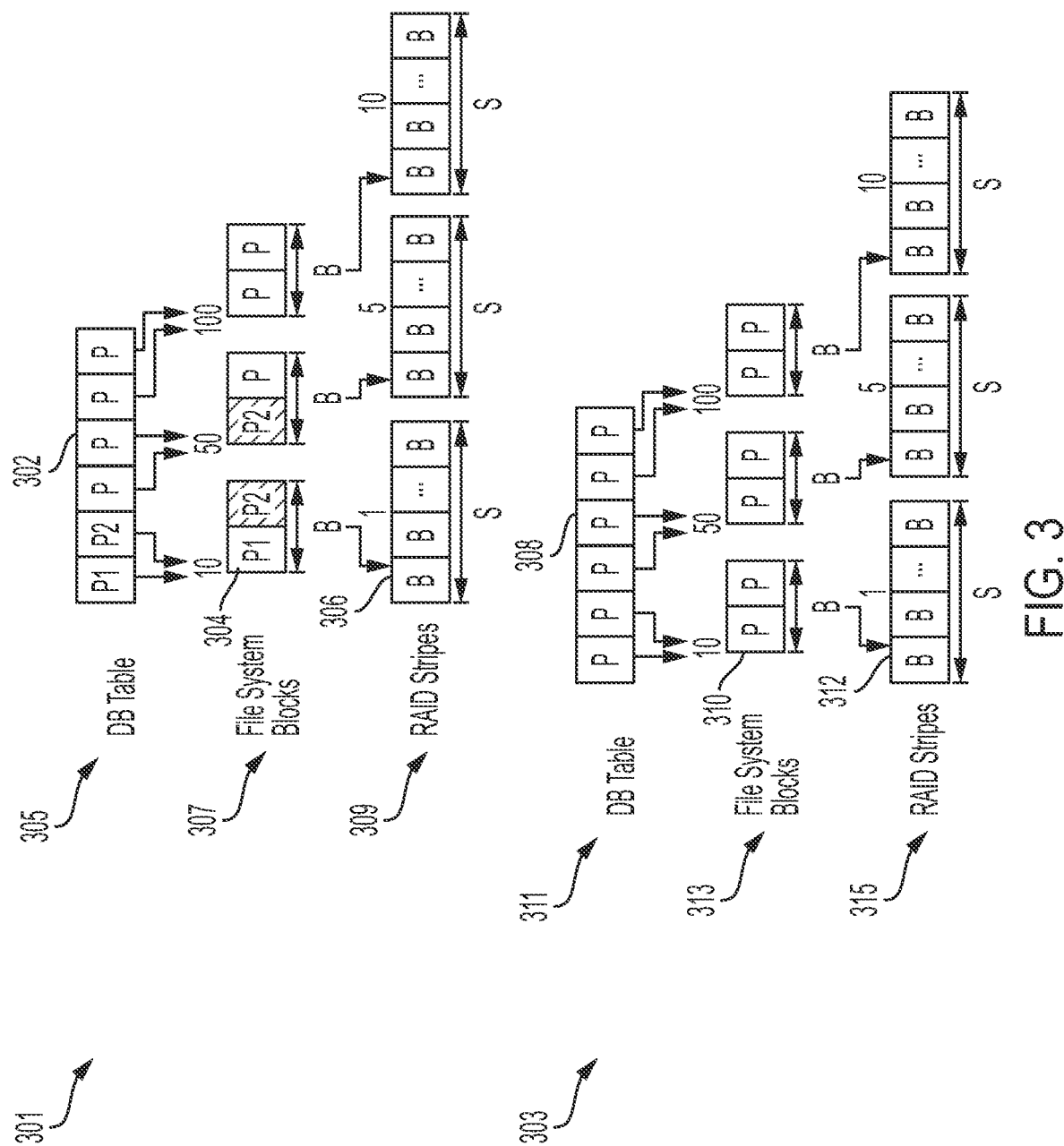
FIG. 3 shows an example diagrams representing example scenarios in which an application causes a split versus a unified processing unit across a file system and/or other systems which can be determined and optimized using the disclosed systems and methods, in accordance with example embodiments of the disclosure.

FIG. 3 shows an example diagrams representing example scenarios in which an application causes a split versus a unified processing unit across a file system and/or other systems which can be determined and optimized using the disclosed systems and methods, in accordance with example embodiments of the disclosure. In particular, FIG. 3 shows example diagrams of a first data alignment scenario 301 and a second data alignment scenario 303, in accordance with example embodiments of the disclosure. In some aspects, first data alignment scenario 301 includes a data block (DB) table 305 that can include processing unit such as P1, P2, and additional portions labeled as Ps. In other aspects, first data alignment scenario 301 includes file system blocks 307 that can a processing unit 304 that can include P1 and a portion of P2 grouped in a block B, another portion of P2 and P grouped in a second block B, and P and P grouped in a third block B. As shown, in this scenario where the disclosed systems have either not determined a compatibility between the application's processing unit and the CSD, the processing units, an example processing unit P 304 that is split into P1 and P2, potentially causing the DB to be split between multiple CSDs and reducing the computational efficiency of the computational storage system. In some aspects, diagram 301 includes RAID stripes 309 that can include blocks 306 (e.g., similar to the blocks described above in connection with file system blocks 307) that are arranged in stripes S.

In some aspects, second data alignment scenario 303 includes a DB table 311 that can include portions P as well. In other aspects, diagram 303 includes file system blocks 313 that can include the portions P grouped in blocks B. Notably, in the second data alignment scenario 303, the disclosed systems have ensured data alignment by preventing the processing unit P being split, and avoiding the situation by which the DB being split between multiple CSDs. This thereby increases the computational efficiency of the computational storage system in comparison to the first data alignment scenario 301. In some aspects, diagram 303 includes RAID stripes 312 that can include blocks (e.g., similar to the blocks described above in connection with file system blocks 310) that are arranged in stripes S. Notably, again there exists a data alignment between the file system blocks 313 and the RAID stripes 315 as a result of the data alignment brought about by the application of the disclosed system and associated mechanisms.

Figure 4:
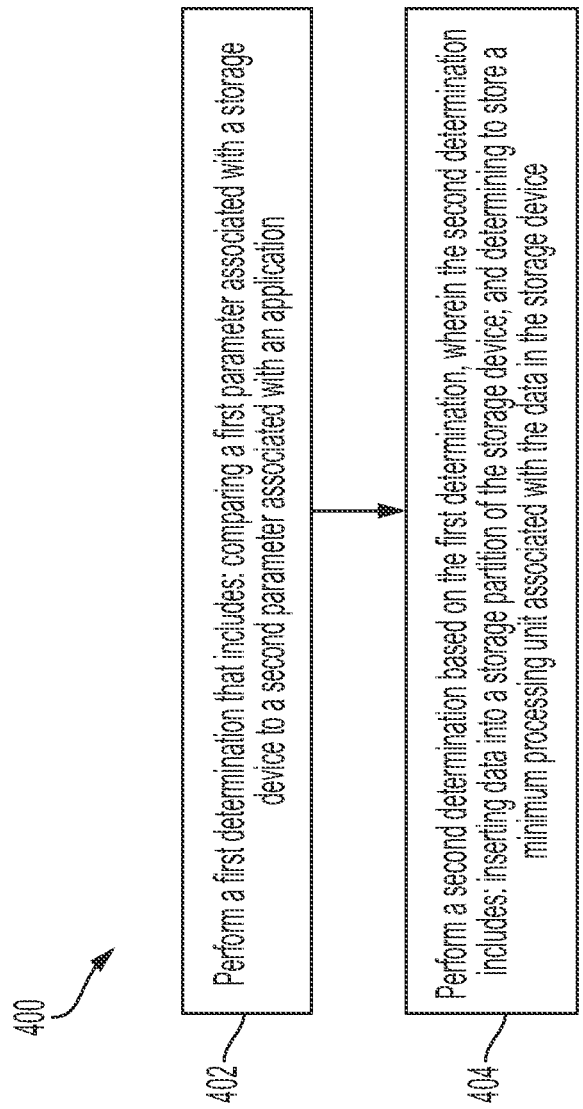
FIG. 4 is an illustration of another exemplary operational flow illustrating example operations associated with the disclosed systems for application compatibility determination, in accordance with example embodiments of the disclosure.

FIG. 4 is an illustration of an exemplary operational process 400 illustrating example operations associated with the disclosed systems for application compatibility determination, in accordance with example embodiments of the disclosure. In some implementations, one or more process blocks of FIG. 4 may be performed by a device. As shown in FIG. 4, process 400 may include performing a first determination that may include: comparing a first parameter associated with a storage device to a second parameter associated with an application (block 402). For example, device may perform a first determination that may include a statistic analysis as described herein. The static analysis can include an application compatibility check, a storage system compatibility check, a RAID compatibility check, and/or a file system compatibility check, as further shown and described above, for example, in connection with FIG. 4.

Further, the static analysis can include a first parameter associated with a storage device such as an application processing unit size (e.g., a minimum processing unit size). The second parameter associated with an application can include a block size of a file system, a file system fragment size m a RAID stripe size, and/or a key value object size, as variously described herein. As also shown in FIG. 4, process 400 may include performing a second determination based on the first determination, where the second determination may include: inserting data into a storage partition of the storage device; and determining to store a minimum processing unit associated with the data in the storage device (block 404). For example, the second determination can include a dynamic analysis (e.g., a dynamic compatibility check) including, but not limited to: a file system compatibility test, a storage system compatibility test, and/or a RAID compatibility test, as further shown and described above. Further, as noted, the second determination may include: inserting data into a storage partition of the storage device which can include a storage and/or memory of a computational storage device. Moreover, as noted, the method can include determining to store a minimum processing unit associated with the data in the storage device, as described above. Additionally, or alternatively, a computational storage device may be selected from a candidate computational devices based, for example, on the data alignment for a task associated with the application and/or a parameter (e.g., latency, throughput, etc.) associated with the CSD. Thus, in some aspects, if two candidate computational devices have the same data alignment enough memory and/or storage capacity to accommodate the amount of data associated with the task, and the task is relatively sensitive to latency, a first one of the candidate computational devices having relatively higher throughput may be selected for the task. Additionally, or alternatively, a computational device may be selected from the candidate computational devices based, for example, on one or more utilization levels of the candidate computational devices. For example, given the same data alignment, if the first candidate computational device having higher throughput has a relatively high utilization (e.g., is relatively busy), a second one of the candidate computational devices having relatively lower throughput but lower utilization may be selected for the task.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Any of the storage devices disclosed herein may be implemented in any form factor such as 3.5 inch, 2.5 inch, 1.8 inch, M.2, Enterprise and Data Center SSD Form Factor (EDSFF), NF1, and/or the like, using any connector configuration such as Serial ATA (SATA), Small Computer System Interface (SCSI), Serial Attached SCSI (SAS), U.2, and/or the like.

Any of the storage devices disclosed herein may be implemented entirely or partially with, and/or used in connection with, a server chassis, server rack, dataroom, datacenter, edge datacenter, mobile edge datacenter, and/or any combinations thereof.

Any of the functionality described herein, including any of the host functionality, device functionally, and/or the like described above with respect to the embodiments disclosed herein may be implemented with hardware, software, or any combination thereof including. For example, they may be implemented with combinational logic, sequential logic, one or more timers, counters, registers, state machines, volatile memories such as DRAM and/or static random access memory (SRAM), nonvolatile memory and/or any combination thereof, CPLDs, FPGAs, ASICs, CPUs including complex instruction set computer (CISC) processors such as x86 processors and/or reduced instruction set computer (RISC) processors such as ARM processors, graphics processing units (GPUs), neural processing units (NPUs), and/or the like, executing instructions stored in any type of memory. In some embodiments, one or more components may be implemented as a system-on-chip (SOC).

The embodiments illustrated described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Figure 5:
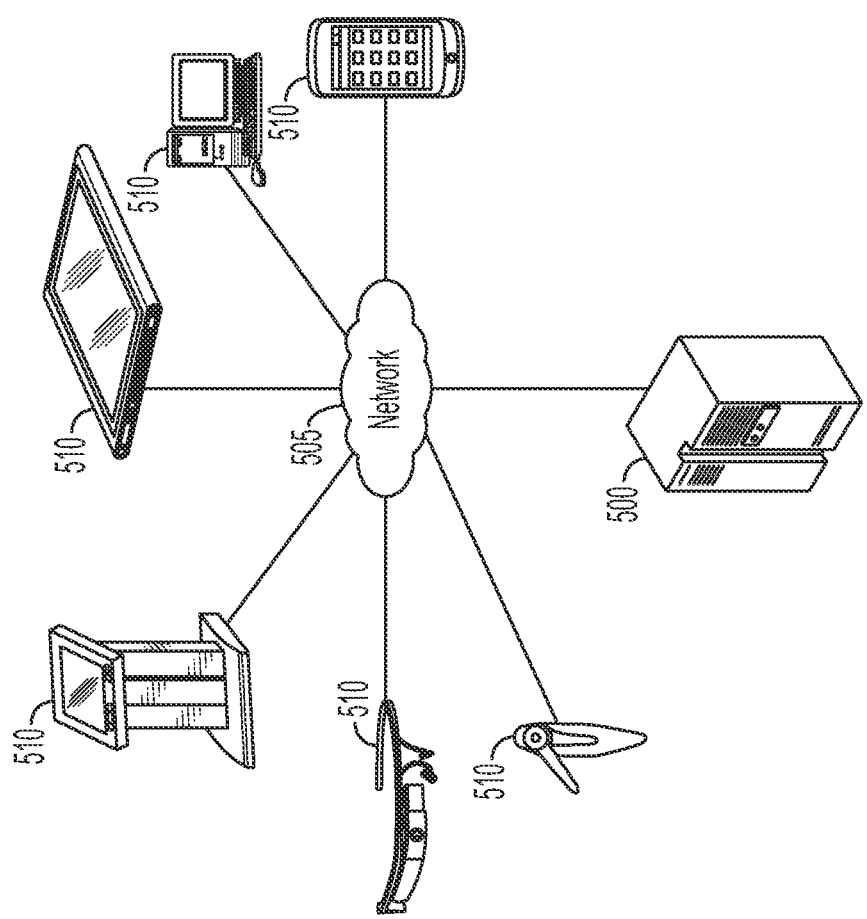
FIG. 5 shows an example schematic diagram of a system that can be used to practice embodiments of the present disclosure.

FIG. 5 shows an example schematic diagram of a system that can be used to practice embodiments of the present disclosure. As shown in FIG. 5, this particular embodiment may include one or more management computing entities 500, one or more networks 505, and one or more user devices 510 (e.g., host devices, storage devices, additional devices, etc.). In various embodiments, the management computing entities 500 can be configured to run operations associated with the disclosed systems and associated embodiments described throughout the disclosure, including, but not limited to, determining a compatibility between an application and a CSD based on the analyses (e.g., static or dynamic analyses) described herein. Further, the management computing entities 500 can reside in any suitable portion of the disclosed systems (e.g., such as a any of the layers shown and described in connection with FIG. 1, one or more CSDs, host application, a remote host, another device, combinations thereof, and/or the like). Each of these components, entities, devices, systems, and similar words used herein interchangeably may be in direct or indirect communication with, for example, one another over the same or different wired or wireless networks. Additionally, while FIG. 5 illustrates the various system entities as separate, standalone entities, the various embodiments are not limited to this particular architecture. As noted, the communications can be performed using the any suitable protocols described further herein.

Figure 6:
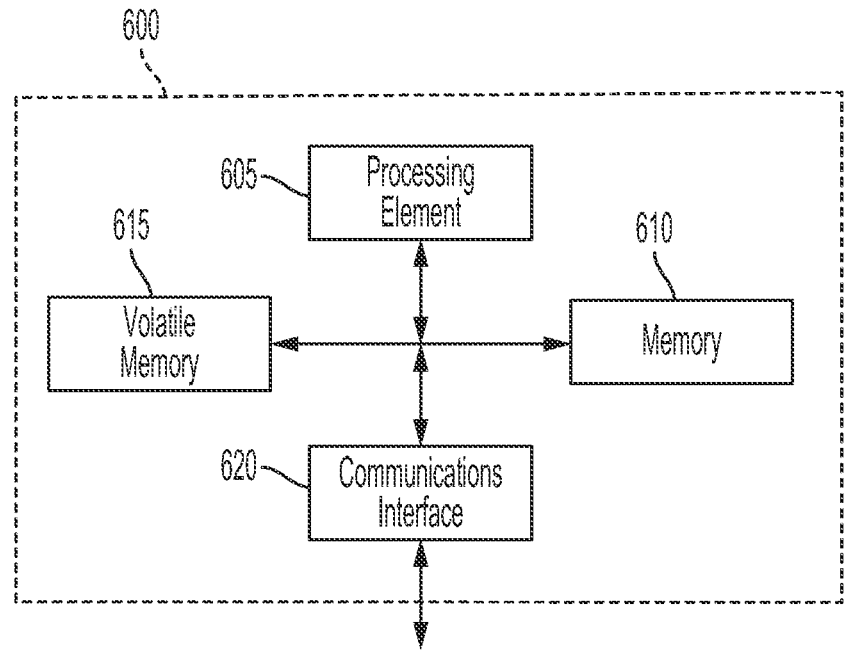
FIG. 6 shows an example schematic diagram of a management computing entity, in accordance with example embodiments of the disclosure.

FIG. 6 shows an example schematic diagram 600 of a management computing entity, in accordance with example embodiments of the disclosure. As noted, the management computing entity can be configured to run operations associated with the disclosed systems and associated embodiments described throughout the disclosure. Further, the management computing entities 500 can reside in any suitable portion of the disclosed systems. In particular, a content component may serve to determine signals indicative of data (e.g., video, audio, text, data, combinations thereof, and/or the like) to be transmitted over the system described herein. In another embodiment, the determination of the signal for transmission may be, for example, based on a user input to a device, a predetermined schedule of data transmissions on a network associated with the system, changes in network conditions, and the like. In one embodiment, the signal may include that data may be encapsulated in a data frame and/or packet that is configured to be sent from a device to one or more devices on the network.

In another embodiment, the processing element 605 may serve to determine various parameters associated data transmitted over the network associated with the disclosed systems. As another example. the processing element 605 may serve perform various acceleration operations such as at least portions of an offload functionality, data pre- or post-processing, combinations thereof, and/or the like.

In one embodiment, a transmitting component (not shown) may serve to transmit the signal from one device to another device on the network. For example, the transmitting component may serve to prepare a transmitter (e.g., transmitter 504 of FIG. 5, below) to transmit the signal over the network. For example, the transmitting component may queue data in one or more buffers, may ascertain that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the data.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 500 may also include one or more communications interfaces 620 for communicating with various computing entities, such as by communicating data, content, information, and/or similar terms used herein interchangeably that can be transmitted, received, operated on, processed, displayed, stored, and/or the like. For instance, the management computing entity 500 may communicate with user devices 510 and/or a variety of other computing entities.

As shown in FIG. 6, in one embodiment, the management computing entity 500 may include or be in communication with one or more processing elements 605 (also referred to as processors, processing circuitry, and/or similar terms used herein interchangeably) that communicate with other elements within the management computing entity 500 via a bus, for example. As will be understood, the processing element 605 may be embodied in a number of different ways. For example, the processing element 605 may be embodied as one or more complex programmable logic devices (CPLDs), microprocessors, multi-core processors, coprocessing entities, application-specific instruction-set processors (ASIPs), microcontrollers, and/or controllers. Further, the processing element 605 may be embodied as one or more other processing devices or circuitry. The term circuitry may refer to an entirely hardware embodiment or a combination of hardware and computer program products. Thus, the processing element 605 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 605 may be configured for a particular use or configured to execute instructions stored in volatile or non-volatile media or otherwise accessible to the processing element 605. As such, whether configured by hardware or computer program products, or by a combination thereof, the processing element 605 may be capable of performing steps or operations according to embodiments of the present disclosure when configured accordingly.

In one embodiment, the management computing entity 500 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 610, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program components, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 500 may further include or be in communication with volatile media (also referred to as volatile storage, memory, memory storage, memory circuitry and/or similar terms used herein interchangeably). In one embodiment, the volatile storage or memory may also include one or more volatile storage or memory media 615, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program components, scripts, source code, object code, byte code, compiled code, interpreted code, machine code, executable instructions, and/or the like being executed by, for example, the processing element 605. Thus, the databases, database instances, database management systems, data, applications, programs, program components, scripts, source code, object code, byte code, compiled code, interpreted code, machine code, executable instructions, and/or the like may be used to control certain aspects of the operation of the management computing entity 500 with the assistance of the processing element 605 and operating system.

As indicated, in one embodiment, the management computing entity 500 may also include one or more communications interfaces 620 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as peripheral component interconnect express (PCIe), fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 500 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, ZigBee, Bluetooth protocols, 5G protocol, wireless universal serial bus (USB) protocols, and/or any other wireless protocol.

Although not shown, the management computing entity 500 may include or be in communication with one or more input elements, such as a keyboard input, a mouse input, a touch screen/display input, motion input, movement input, audio input, pointing device input, joystick input, keypad input, and/or the like. The management computing entity 500 may also include or be in communication with one or more output elements (not shown), such as audio output, video output, screen/display output, motion output, movement output, and/or the like.

As will be appreciated, one or more of the management computing entity's 500 components may be located remotely from other management computing entity 500 components, such as in a distributed system. Furthermore, one or more of the components may be combined and additional components performing functions described herein may be included in the management computing entity 500. Thus, the management computing entity 500 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device 510 that includes one or more components that are functionally similar to those of the management computing entity 500.

In various aspects, the processing component, the transmitting component, and/or the receiving component (not shown) may be configured to operate on one or more may include aspects of the functionality of the management computing entity 500, as shown and described in connection with FIGS. 5 and 6 here. In particular, the processing component, the transmitting component, and/or the receiving component may be configured to be in communication with one or more processing elements 605, memory 610, volatile memory 615, and may include a communication interface 620 (e.g., to facilitate communication between devices).

Figure 7:
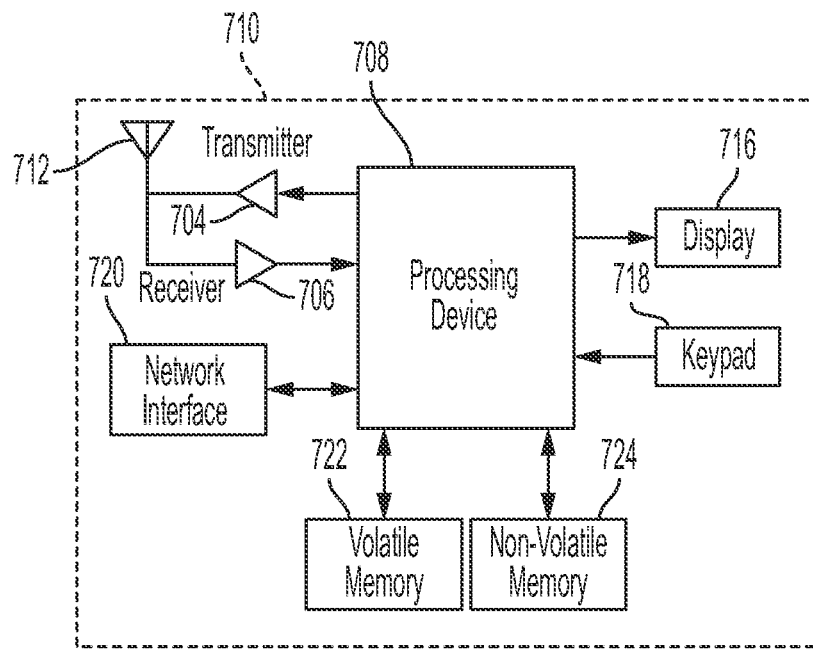
FIG. 7 shows an example schematic diagram of a user device, in accordance with example embodiments of the disclosure.

FIG. 7 shows an example schematic diagram of a user device, in accordance with example embodiments of the disclosure. FIG. 7 provides an illustrative schematic representative of a user device 710 (e.g., a host device, a storage device, a peripheral device, etc.) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 710 can be operated by various parties. As shown in FIG. 7, the user device 710 can include an antenna 712, a transmitter 704 (for example radio), a receiver 706 (for example radio), and a processing element 708 (for example CPLDs, FPGAs, microprocessors, multi-core processors, co-processing entities, ASIPs, microcontrollers, and/or controllers) that provides signals to and receives signals from the transmitter 704 and receiver 706, respectively.

The signals provided to and received from the transmitter 704 and the receiver 706, respectively, may include signaling information in accordance with air interface standards of applicable wireless systems. In this regard, the user device 710 may be capable of operating with one or more air interface standards, communication protocols, modulation types, and access types. More particularly, the user device 710 may operate in accordance with any of a number of wireless communication standards and protocols, such as those described above with regard to the management computing entity 700 of FIG. 7. In a particular embodiment, the user device 710 may operate in accordance with multiple wireless communication standards and protocols, such as the disclosed IoT DOCSIS protocol, UMTS, CDMA2000, 1×RTT, WCDMA, TD-SCDMA, LTE, E-UTRAN, EVDO, HSPA, HSDPA, 5G, Wi-Fi, Wi-Fi Direct, WiMAX, UWB, IR, NFC, Bluetooth, USB, and/or the like. Similarly, the user device 710 may operate in accordance with multiple wired communication standards and protocols, such as those described above with regard to the management computing entity 700 via a network interface 720.

Via these communication standards and protocols, the user device 710 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Component Dialer (SIM dialer). The user device 710 can also download changes, add-ons, and updates, for instance, to its firmware, software (for example including executable instructions, applications, program components), and operating system.

According to one embodiment, the user device 710 may include location determining aspects, devices, components, functionalities, and/or similar words used herein interchangeably. For example, the user device 710 may include outdoor positioning aspects, such as a location component adapted to acquire, for example, latitude, longitude, altitude, geocode, course, direction, heading, speed, universal time (UTC), date, and/or various other information/data. In one embodiment, the location component can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 710 position in connection with a variety of other systems, including cellular towers, Wi-Fi access points, and/or the like. Similarly, the user device 710 may include indoor positioning aspects, such as a location component adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 710 may also comprise a user interface (that can include a display 716 coupled to a processing element 708) and/or a user input interface (coupled to a processing element 708). For example, the user interface may be a user application, browser, user interface, and/or similar words used herein interchangeably executing on and/or accessible via the user device 710 to interact with and/or cause display of information from the management computing entity 700, as described herein. The user input interface can comprise any of a number of devices or interfaces allowing the user device 710 to receive data, such as a keypad 718 (hard or soft), a touch display, voice/speech or motion interfaces, or other input devices. In embodiments including a keypad 718, the keypad 718 can include (or cause display of) the conventional numeric (0-9) and related keys (#, *), and other keys used for operating the user device 710 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 710 can also include volatile storage or memory 722 and/or non-volatile storage or memory 724, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program components, scripts, source code, object code, byte code, compiled code, interpreted code, machine code, executable instructions, and/or the like to implement the functions of the user device 710. As indicated, this may include a user application that is resident on the entity or accessible through a browser or other user interface for communicating with the management computing entity 700 and/or various other computing entities.

In another embodiment, the user device 710 may include one or more components or functionality that are the same or similar to those of the management computing entity 700, as described in greater detail above. As will be recognized, these architectures and descriptions are provided for example purposes only and are not limiting to the various embodiments.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for memory management, comprising:
performing, via a processor of a storage device, a first determination that comprises comparing a minimum processing unit size associated with the storage device to a parameter associated with an application, the parameter comprising a file system block size;
changing, via the processor of the storage device, the file system block size based on an alignment between the minimum processing unit size and the file system block size;
performing, via the processor of the storage device, a second determination based on the first determination, wherein the second determination comprises inserting data into a storage partition of the storage device; and storing a processing unit associated with the data in the storage device based on changing the file system block size and based on the second determination, wherein the second determination indicates that storing the processing unit in the storage device avoids splitting the processing unit among multiple devices.

2. The method of claim 1, wherein the minimum processing unit size comprises a variable-length unit or a fixed-length unit.

3. The method of claim 1, wherein the parameter comprises a file system fragment size.

4. The method of claim 1, wherein the parameter comprises a RAID stripe size.

5. The method of claim 1, wherein the parameter comprises a key value object size.

6. The method of claim 1, wherein changing the file system block size comprises setting the file system block size to be a positive integer multiple of the minimum processing unit size of the application based on the first determination indicating a misalignment between the file system block size and the minimum processing unit size of the application.

7. The method of claim 1, wherein the second determination indicating that storing the processing unit in the storage device avoids splitting the processing unit among multiple devices is based at least in part on changing the file system block size.

8. A device for memory management comprising one or more processors configured to:
    perform a first determination that comprises comparing a minimum processing unit size associated with a storage device to a parameter associated with an application, the parameter comprising a file system block size;
    change the file system block size based on an alignment between the minimum processing unit size and the file system block size;
    perform a second determination based on the first determination, wherein the second determination comprises inserting data into a storage partition of the storage device; and
    store a processing unit associated with the data in the storage device based on changing the file system block size and based on the second determination, wherein the second determination indicates that storing the processing unit in the storage device avoids splitting the processing unit among multiple devices.

9. The device of claim 8, wherein the minimum processing unit size comprises a variable-length unit or a fixed-length unit.

10. The device of claim 8, wherein the parameter comprises a file system fragment size.

11. The device of claim 8, wherein the parameter comprises a RAID stripe size.

12. The device of claim 8, wherein the parameter comprises a key value object size.

13. The device of claim 8, wherein the device comprises a computational storage device.

14. A non-transitory computer-readable medium storing a set of instructions for memory management, the set of instructions comprising one or more instructions that, when executed by one or more processors of a device, cause the device to:
    perform a first determination that comprises comparing a minimum processing unit size associated with a storage device to a parameter associated with an application, the parameter comprising a file system block size;
    change the file system block size based on an alignment between the minimum processing unit size and the file system block size;
    perform a second determination based on the first determination, wherein the second determination comprises inserting data into a storage partition of the storage device; and
    store a processing unit associated with the data in the storage device based on changing the file system block size and based on the second determination, wherein the second determination indicates that storing the processing unit in the storage device avoids splitting the processing unit among multiple devices.

15. The non-transitory computer-readable medium of claim 14, wherein the minimum processing unit size comprises a variable-length unit or a fixed-length unit.

16. The non-transitory computer-readable medium of claim 14, wherein the parameter comprises a file system fragment size.

17. The non-transitory computer-readable medium of claim 14, wherein the parameter comprises a RAID stripe size.

18. The non-transitory computer-readable medium of claim 14, wherein the parameter comprises a key value object size.

19. The non-transitory computer-readable medium of claim 14, wherein the device comprises a computational storage device.

* * * * *